Dec. 14, 1943.   H. A. KNOX   2,336,485
HYDRAULIC CHECK
Filed Oct. 15, 1942   3 Sheets-Sheet 1

Inventor
Harry A. Knox

Dec. 14, 1943. H. A. KNOX 2,336,485
HYDRAULIC CHECK
Filed Oct. 15, 1942 3 Sheets-Sheet 2
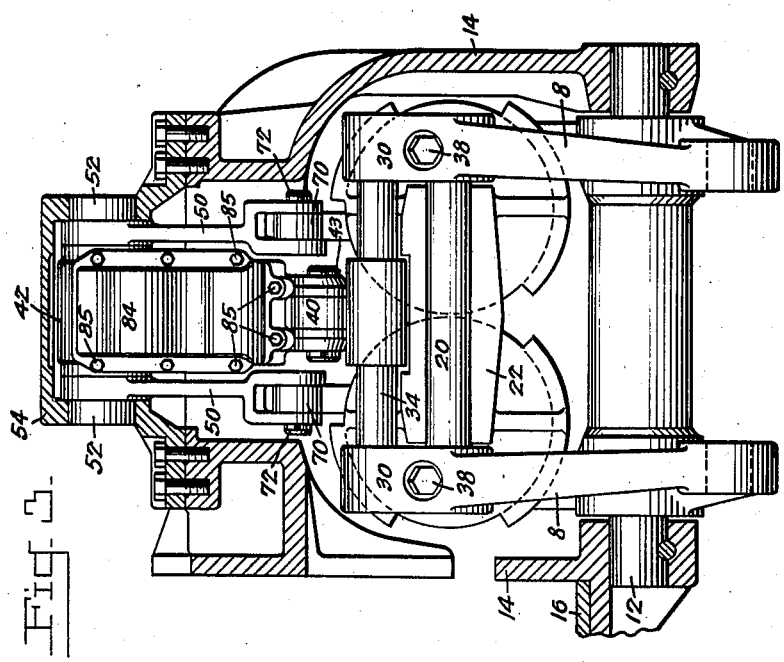
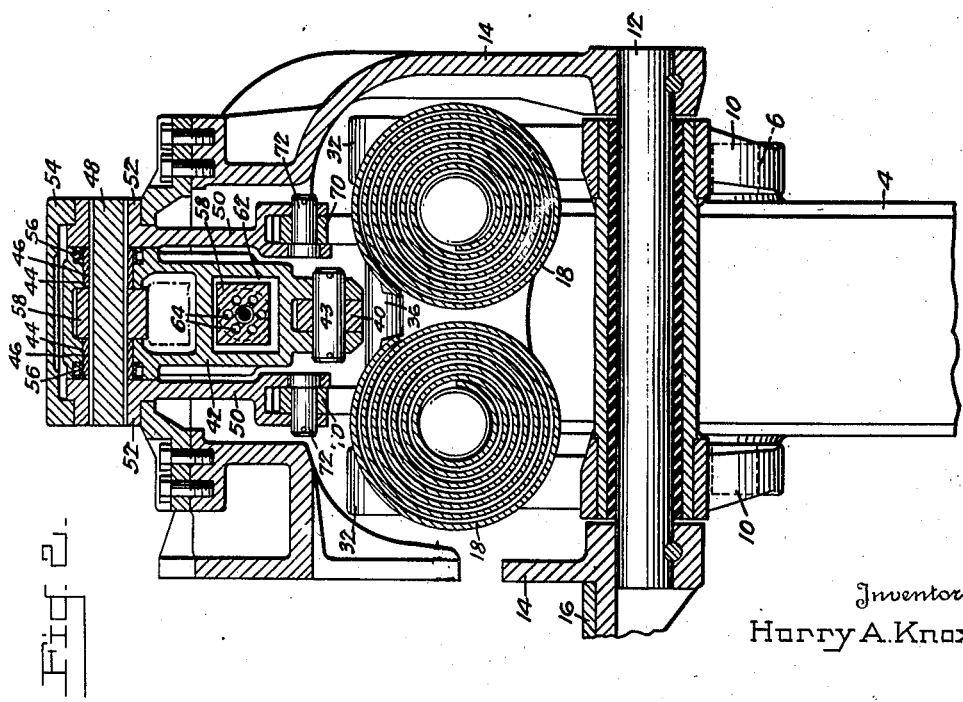
Inventor
Harry A. Knox
Attorneys

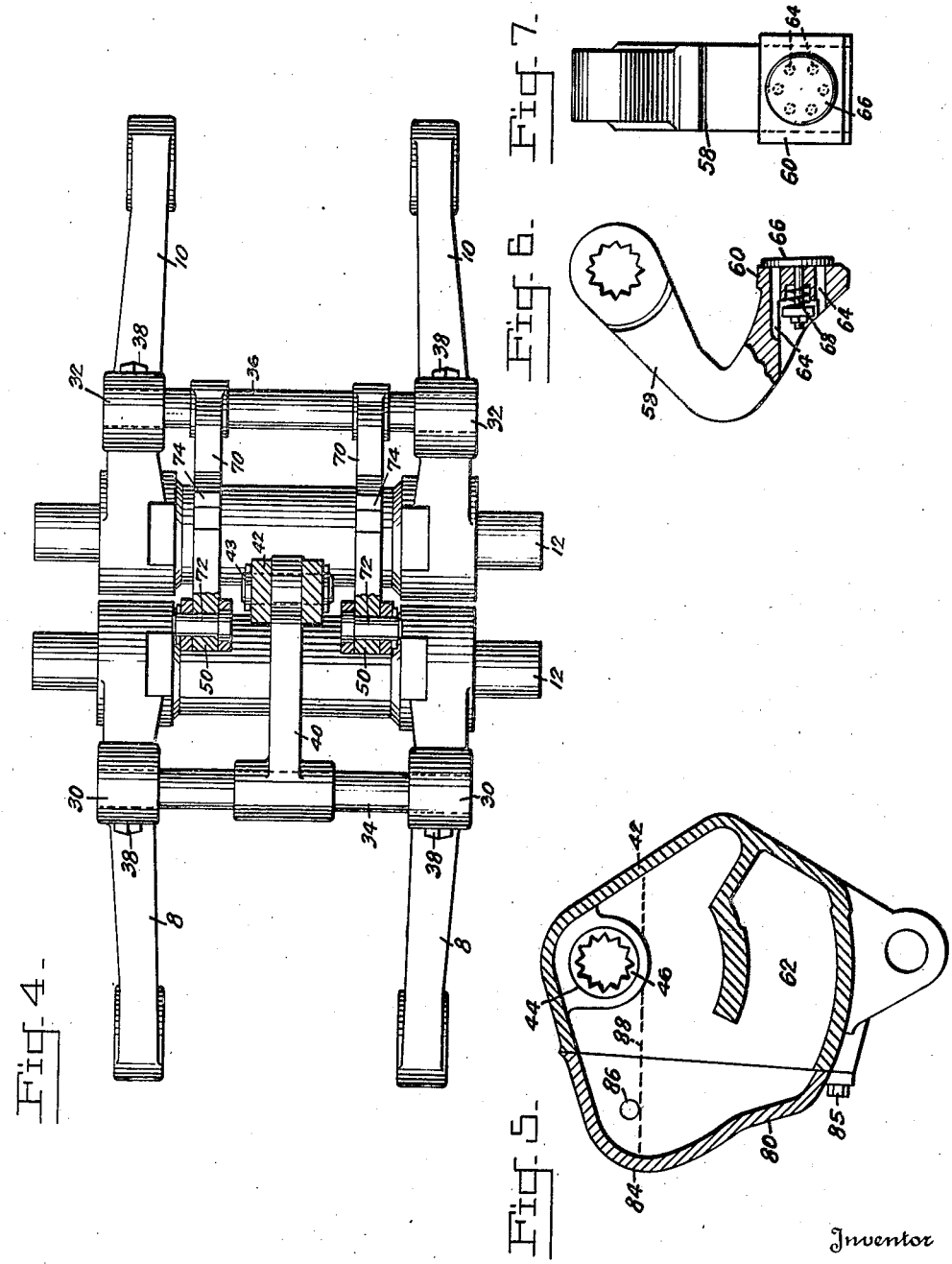

Patented Dec. 14, 1943

2,336,485

UNITED STATES PATENT OFFICE 2,336,485

HYDRAULIC CHECK

Harry A. Knox, Washington, D. C.

Application October 15, 1942, Serial No. 462,187

3 Claims. (Cl. 188—89)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to shock absorbers or hydraulic checks, particularly as applied to combat vehicles such as tanks.

It is the object of this invention to provide a hydraulic check or shock absorber for the suspension mechanism of vehicles to retard or check the action of the supporting spring when a wheel drops into a hole. As applied, the invention is adapted to a double-axle truck of a track-laying vehicle. The truck, or "bogie," is so made that the load on the two axles compresses a spring; therefore, sudden release of the load by one wheel dropping into a hole or off a bump permits sudden expansion of the spring. This abrupt spring expansion is retarded by a hydraulic pressure chamber in which a piston moves. The piston does not fit tight in the chamber, so that liquid is permitted to flow around the piston slowly. A check valve in the piston permits free flow through the piston in the direction of further compression of the spring. The pressure chamber and piston are disposed in a fluid tight casing, and the arrangement of parts is such that the portion of the casing containing liquid has no access to the outside of the casing. This is accomplished by an arcuate pressure chamber disposed below the liquid level. The piston is mounted on an arm which pivots about a shaft extending outside the casing; the shaft is disposed above the liquid level. This construction has the further advantage of having a fixed volume inside the casing, thus lessening the tendency of liquid to leak through openings in the casing.

The specific nature of the invention as well as other objects and advantages thereof will clearly appear from a description of a preferred embodiment as shown in the accompanying drawings in which:

Fig. 1 of the drawings is a side elevation of a suspension mechanism, with parts broken away and in section, showing the invention.

Fig. 2 is a view in section substantially on line 2—2 of Fig. 1.

Fig. 3 is an end elevation, with parts broken away and in section.

Fig. 4 is a top plan view of part of the mechanism, showing most of the linkage.

Fig. 5 is a detail view, in section, of the casing.

Fig. 6 is a detail view of the arm and piston, with parts broken away and in section.

Fig. 7 is an end elevational view of the arm and piston.

Figure 1:
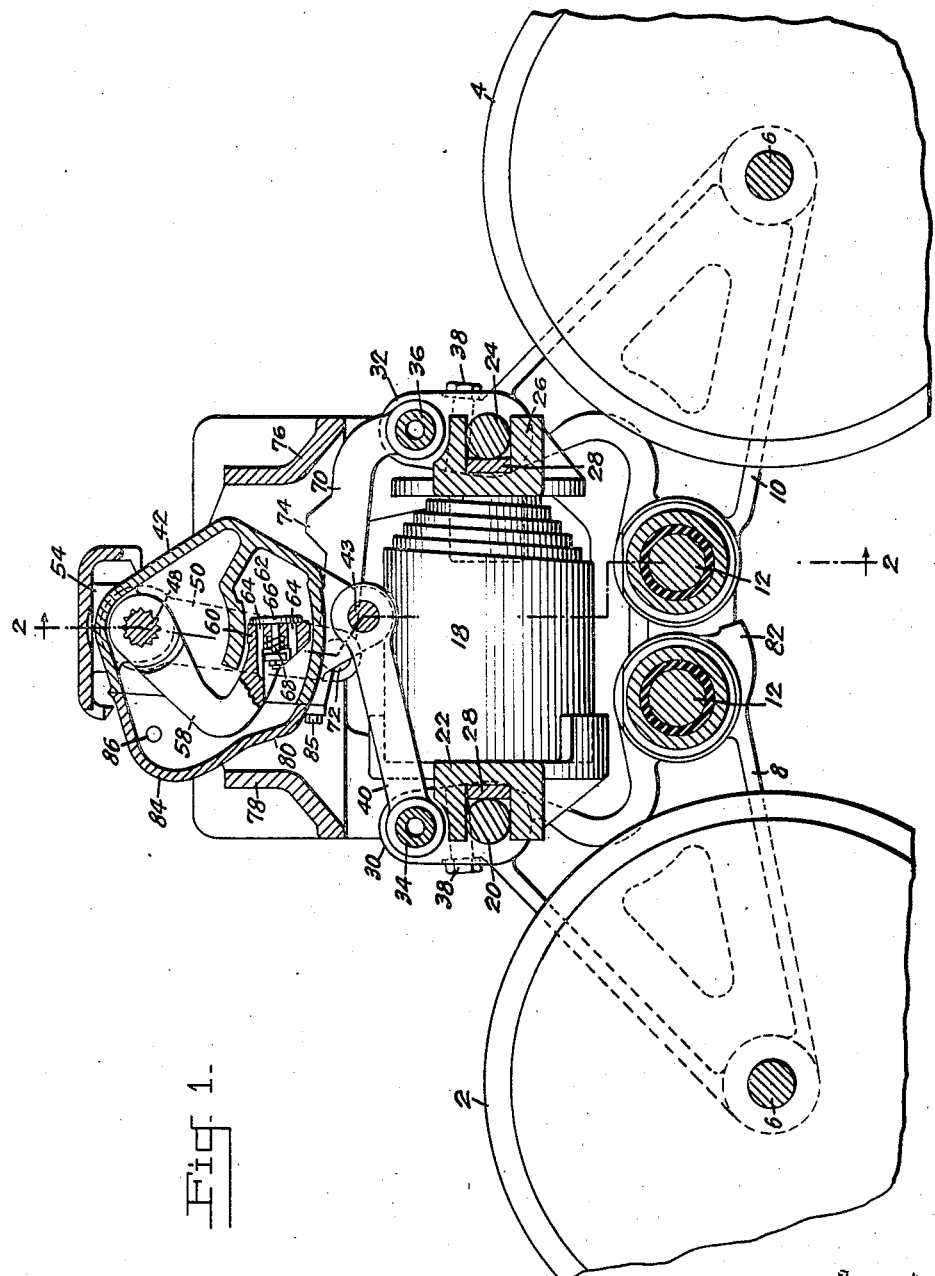

Referring to the drawings in detail, wheels 2 and 4 are shown as being adapted to ride on the track of a track-laying vehicle, although of course their application is not so limited. The wheels rotate on axles 6 mounted in arms 8 and 10, which are pivoted about axles 12. Axles 12 are carried by a bracket 14 which surrounds the mechanism, but is shown broken away in Fig. 3 to expose the mechanism. Bracket 14 is secured to the frame 16 of the vehicle in any suitable manner. In supporting the vehicle, the arms 8 and 10 tend to rotate oppositely about axles 12, compressing springs 18 between the arms. For this purpose, arm 8 carries a cross member 20 which engages a spring bearing block 22, and arm 10 carries a cross member 24 which engages a spring bearing block 26. The springs are compressed between blocks 22 and 26. Wear pads 28 may be provided if desired to permit easy replacement of parts readily worn out by friction.

Integral with each arm 8 and 10 are short extensions 30 and 32, respectively. A bar 34 extends between extensions 30, and a similar bar 36 is carried by extensions 32. Bars 34 and 36 are held in extensions 30 and 32, respectively, by the clamping action of cap screws 38. Note in Fig. 1 that screws 38 intersect cross members 20 and 24, which are recessed or notched at the place of intersection to permit screws 38 to pass through them. The engagement of screws 38 in the notches serves to hold members 20 and 24 in place.

Mounted on bar 34 is a link 40, which connects bar 34 with casing 42 by means of pin 43. Link 40 may pivot about bar 34, and is not restrained laterally on the bar, but is permitted sliding movement thereon to align itself with the connection to casing 42. Casing 42 has an opening 44 in each face which receives a bearing 46. Bearing 46 is serrated to receive a serrated shaft 48 to which cranks 50 are secured at its ends. Cranks 50 are provided with bosses 52 which are permitted to pivot in the cap or top bracket 54, secured to main bracket 14. Thus casing 42 is supported by shaft 48 and pivots thereon by means of bearings 46. Any suitable fluid seal 56 may be provided to retard the loss of fluid between casing 42 and bearing 46.

At the middle of shaft 48 is mounted by a press fit, an arm 58, also serrated so as to turn with the shaft and the crank. Arm 58 is bent as shown in Figs. 1 and 6, and at its lower end carries a piston 60 of rectangular section which is adapted to move in pressure chamber 62 of casing 42. The pressure chamber is curved, as can be seen in Figs. 1 and 5, and the curvature is preferably circular, being described by arcs struck from the center of opening 44. Arm 58 swings piston 60 about this same axis, so that piston 60 is adapted to move in the curved pressure chamber. As can be seen (exaggerated) in Figs. 1 and 2, the piston does not fit tightly against the walls of the pressure chamber but is provided with a small amount of clearance to permit the slow passage of fluid past the piston during expansion of springs 18. Therefore, inasmuch as the piston is never in actual contact with the walls of the pressure chamber, a highly polished finish of the piston and chamber surfaces is not necessary. It may be noted that the amount of clearance may be of the order of magnitude of several thousandths of an inch, but it is of course impossible to state broadly what the clearance should be, inasmuch as it is determined by the load, spring characteristics, desired speed of recovery, and other variable factors.

The above described clearance permits slow passage of fluid past the piston during the cushioning stroke. On the return stroke, substantially free flow through the piston is permitted by ports 64. Poppet valve 66 is adapted to close these ports, with the help of a light spring 68, during the cushioning stroke of the piston.

The lower ends of cranks 50 are hinged to links 70 by pins 72. The other ends of links 70 are pivotally mounted on bar 36, but are not restrained laterally, to permit self alignment of the linkage.

Links 70 carry projections 74 on their upper edges for engagement with stop 76 on bracket 14. Another stop 78 on the other side is provided for engagement with surface 80 of casing 42. These positive stops serve to limit the travel of the piston and casing relatively to each other to prevent damage which might occur to the piston and its valve by striking the end of the pressure chamber. Another stop 82 on arm 8, near its pivot point on shaft 12, may be provided if desired to limit the extent of drop of wheel 2 during expansion of springs 18.

Casing 42 is of course made fluid tight, or as nearly so as possible. Tendencies of fluid to leak out are reduced by the fact that the internal volume remains substantially constant. Furthermore, the parts are so arranged that the pressure chamber is below the liquid level line, assuring a constant liquid supply for the chamber, and openings through the chamber for the serrated shaft and bearing are substantially above the liquid supply level. For convenience in assembly, casing 42 may be divided as shown, comprising the chamber portion and a cover portion 84 bolted or otherwise secured to the chamber portion to make a fluid tight seal, as by screws 85. To facilitate keeping the liquid level below the opening 44, a filler hole 86 may be provided in cover 84, so positioned that a horizontal line 88, tangent to the lower edge of hole 86 and representing the liquid level, passes beneath the lower edge of opening 44. Then, if liquid is pumped or poured in through the filler opening until the level in the casing reaches the opening, the operator knows there is enough liquid in the casing for the functioning of the shock absorber, and he then stops the liquid feed. The liquid level is then below, or at most not far above, opening 44.

*Operation.*—With the vehicle moving over uneven terrain, let us take the condition of a wheel riding up onto a sudden rise, as would be the case when striking a stone or other bump, or when riding out of a depression or hole. If it is wheel 2 that hits the upward bump, arm 8 pivots clockwise about its axle 12, moving cross member 20 and bearing block 22 to the right as seen in Fig. 1. Springs 18 are thus compressed between bearing blocks 22 and 26. Upright extensions 30 are moved to the right, carrying bar 34 and link 40 to the right. Link 40 pivots casing 42 counterclockwise about its bearings on the serrated shaft. Thus, the pressure chamber moves to the right, away from the piston. Flow through ports 64 is permitted by the unseating of valve 66. Similarly, when wheel 4 rides up onto a bump, arm 10 pivots counterclockwise about its axle 12, compressing the springs, and moving bar 36 and links 70 left. Cranks 50 pivot clockwise, moving arm 58 clockwise, and withdrawing the piston from the pressure chamber. Liquid again flows freely through the ports 64, the resistance of spring 68 being very small. Thus it is seen that upward movement of either wheel 2 or 4, which compresses springs 18, is substantially unhindered by the shock absorber mechanism.

Now, when wheel 2 drops off a projection or into a hole, the energy stored up in springs 18 is released, if it is permitted to be released freely, considerable shock results. However, through the above described linkage, casing 42 pivots clockwise, squeezing liquid slowly through the clearance between the piston and the chamber walls, and retarding the expansion of springs 18. Similarly, a sudden drop of wheel 4 is prevented because cranks 50 pivot arm 58 counterclockwise, forcing piston 60 into the pressure chamber and producing the above-described retarding effect.

I claim:

1. In a shock absorber for a vehicle having suspension means, a casing having an opening, a shaft rotatable in the opening, a pressure chamber in the casing, an arm secured to the shaft, a piston on the arm and movable in the chamber, a crank secured to the shaft outside the casing, a link adapted to join the crank to one part of the suspension means of the vehicle, and a link joining the casing to another part of the suspension means, said parts being movable relatively to each other to absorb road shocks.

2. The invention in claim 1, in which there is a fluid passage through the piston, and a valve to control fluid flow through the piston.

3. The invention in claim 1, in which there is clearance between the piston and the walls of the pressure chamber, permitting fluid flow around the piston.

HARRY A. KNOX.